United States Patent
Kamiya

(10) Patent No.: US 9,413,929 B2
(45) Date of Patent: Aug. 9, 2016

(54) INTERMEDIATE UNIT AND CAMERA SYSTEM

(71) Applicant: Sony Corporation, Tokyo (JP)

(72) Inventor: Koji Kamiya, Kanagawa (JP)

(73) Assignee: Sony Corporation, Tokyo (JP)

(*) Notice: Subject to any disclaimer, the term of this patent is extended or adjusted under 35 U.S.C. 154(b) by 159 days.

(21) Appl. No.: 14/199,474

(22) Filed: Mar. 6, 2014

(65) Prior Publication Data

US 2014/0300807 A1    Oct. 9, 2014

(30) Foreign Application Priority Data

Apr. 5, 2013   (JP) ................................. 2013-079641

(51) Int. Cl.
   *H04N 5/232*   (2006.01)
   *H04N 5/225*   (2006.01)

(52) U.S. Cl.
   CPC ......... *H04N 5/2251* (2013.01); *H04N 5/23203* (2013.01)

(58) Field of Classification Search
   CPC ........ H04N 5/222; H04N 5/225; H04N 5/268
   USPC ............... 348/211.14, 211.11, 211.99, 211.1, 348/211.4, 722
   See application file for complete search history.

(56) References Cited

U.S. PATENT DOCUMENTS

| | | | |
|---|---|---|---|
| 2008/0198247 A1* | 8/2008 | Yonaha | H04N 5/232 348/254 |
| 2011/0043701 A1* | 2/2011 | Kurita | H04N 7/0125 348/578 |
| 2014/0055637 A1* | 2/2014 | Jenkins | H04N 5/46 348/222.1 |

FOREIGN PATENT DOCUMENTS

| | | | |
|---|---|---|---|
| JP | 06022330 A | * | 1/1994 |
| JP | 2001-292348 | | 10/2001 |
| JP | 2007324882 A | * | 12/2007 |

* cited by examiner

*Primary Examiner* — Sinh Tran
*Assistant Examiner* — Zhenzhen Wu
(74) *Attorney, Agent, or Firm* — Michael Best and Friedrich LLP

(57) ABSTRACT

Provided is an intermediate unit including a first connect unit, a second connect unit, and an information bridge unit. The first connect unit is for connecting a camera unit having a first resolution in one of a spatial direction and a temporal direction. The second connect unit is for connecting a camera control unit for a camera unit having a second resolution lower than the first resolution in one of the spatial direction and the temporal direction. The information bridge unit is interposed between the first connect unit and the second connect unit and configured to bridge information exchanged between the camera unit and the camera control unit.

20 Claims, 7 Drawing Sheets

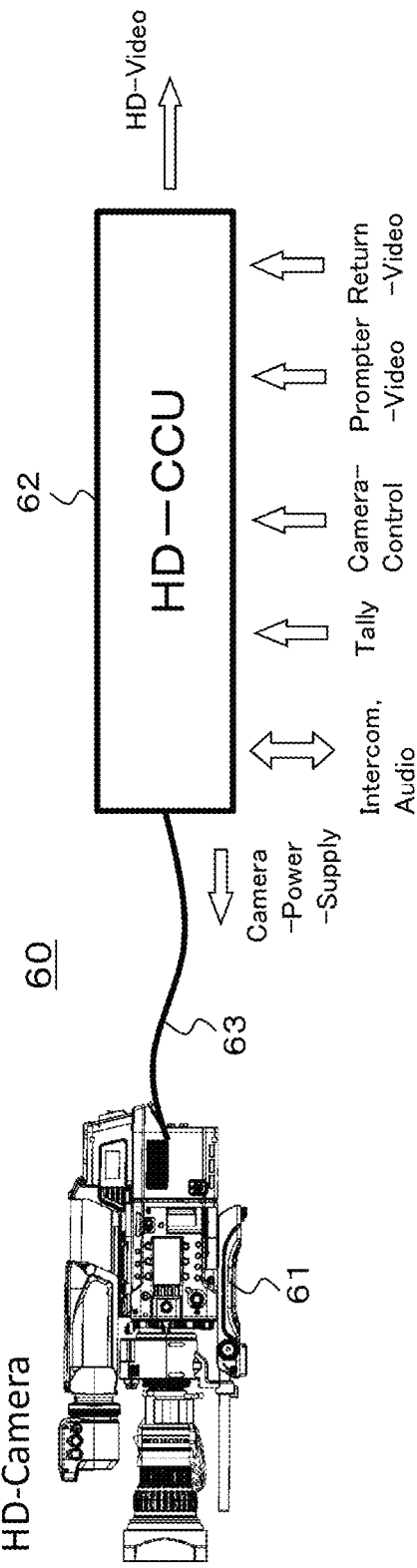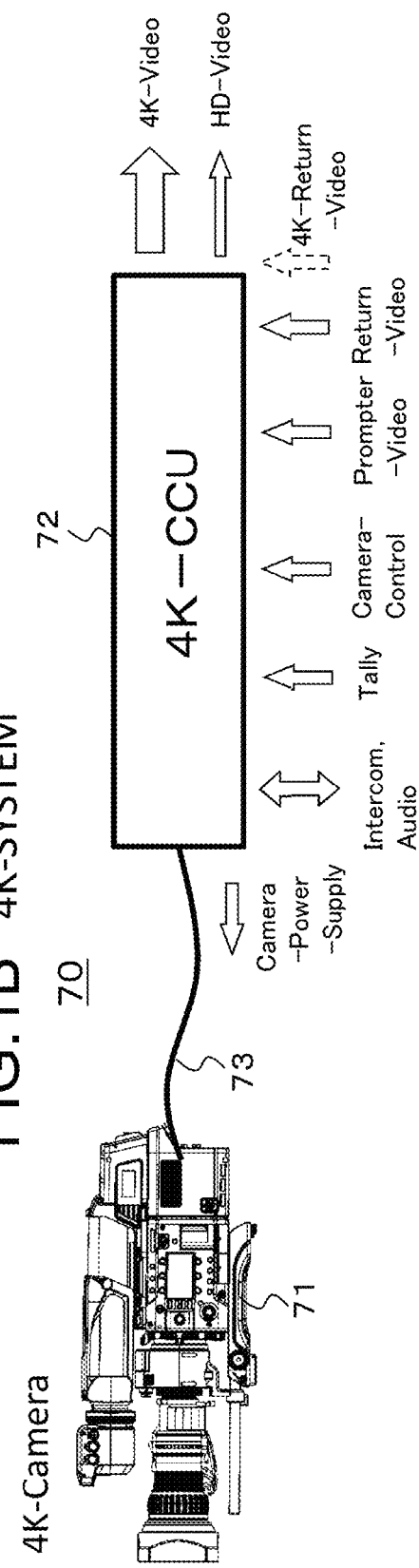

INTERMEDIATE UNIT AND CAMERA SYSTEM

CROSS REFERENCE TO RELATED APPLICATIONS

This application claims the benefit of Japanese Priority Patent Application JP 2013-079641 filed Apr. 5, 2013, the entire contents of which are incorporated herein by reference.

BACKGROUND

The present disclosure relates to an intermediate unit and a camera system, more particularly, to an intermediate unit interposed between a camera and a camera control unit, and the like.

A broadcast camera system is constituted of an apparatus that forms a pair with a camera control unit (CCU) connected to a camera unit (CAM) by a camera cable as disclosed in Japanese Patent Application Laid-open No. 2001-292348, for example. For example, an SD-resolution camera unit (SD-camera) is connected to a camera control unit for an SD-resolution camera unit (SD_CCU). Further, an HD-resolution camera unit (HD-camera) is connected to a camera control unit for an HD-resolution camera unit (HD_CCU). As described above, the camera unit and the camera control unit are structured as a pair.

SUMMARY

From the past, in updating a broadcast camera, it has been necessary to update the camera unit and the camera control unit in a pair for introducing a camera unit of a new format, with the result that high costs have been required and it has been difficult to realize a mutual exchange with the existing apparatus.

In view of the circumstances as described above, there is a need to reduce costs in introducing a camera unit of a new format.

According to an embodiment of the present disclosure, there is provided an intermediate unit, including:

a first connect unit for connecting a camera unit having a first resolution in one of a spatial direction and a temporal direction;

a second connect unit for connecting a camera control unit for a camera unit having a second resolution lower than the first resolution in one of the spatial direction and the temporal direction; and an information bridge unit that is interposed between the first connect unit and the second connect unit and configured to bridge information exchanged between the camera unit and the camera control unit.

In this embodiment, the intermediate unit includes the first connect unit and the second connect unit. The first connect unit is a connect unit for connecting the camera unit having the first resolution in the spatial direction or the temporal direction. The second connect unit is a connect unit for connecting the camera control unit for the camera unit having the second resolution lower than the first resolution in the spatial direction or the temporal direction. For example, the first resolution may be a 4K resolution, and the second resolution may be an HD resolution. Alternatively, for example, the first resolution may be a high frame rate resolution, and the second resolution may be a normal frame rate resolution.

For example, the camera unit is connected to the first connect unit of the intermediate unit via a first transmission path such as an optical transmission cable. Moreover, the camera control unit is connected to the second connect unit of the intermediate unit via a second transmission path such as an optical transmission cable, for example. As described above, the camera unit having the first resolution is connected to the camera control unit for the camera unit having the second resolution via the intermediate unit.

The intermediate unit includes the information bridge unit. The information bridge unit is interposed between the first connect unit and the second connect unit. By the information bridge unit, information exchanged between the camera unit and the camera control unit is bridged.

For example, the information bridge unit may convert a video signal of the first resolution input to the first connect unit from the camera unit into a video signal of the second resolution and output the signal to the second connect unit. In this case, the information bridge unit may carry out camera signal processing on the video signal of the first resolution before the video signal of the first resolution input to the first connect unit from the camera unit is converted into the video signal of the second resolution.

In this case, the intermediate unit may further include a video signal output unit configured to externally output the video signal of the first resolution that has been subjected to the camera signal processing by the information bridge unit. Further, in this case, the information bridge unit may output a color bar signal corresponding to the video signal of the first resolution in a state where the video signal of the first resolution is not supplied to the first connect unit from the camera unit.

It should be noted that in this embodiment, for example, the information bridge unit may mediate a communication related to cameral control between the camera unit and the camera control unit. Alternatively, in this embodiment, for example, the information bridge unit may mediate a power supply request from the camera unit to the camera control unit. Moreover, in this embodiment, for example, the information bridge unit may extract a timing signal from a camera control signal input to the second connect unit from the camera control unit and control processing timings of the units based on the timing signal.

As described above, according to the embodiment of the present disclosure, it becomes possible to connect the camera unit having the first resolution to the camera control unit for the camera unit having the second resolution lower than the first resolution. Therefore, costs in introducing a camera unit of a new format can be reduced.

According to the embodiment of the present disclosure, costs in introducing a camera unit of a new format can be reduced. It should be noted that the effect described in the specification is merely an example and is not limited thereto. In addition, there may be an additional effect.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 1A and 1B are diagrams showing structural examples of a camera system (HD-SYSTEM) and a camera system (4K-SYSTEM);

DETAILED DESCRIPTION OF EMBODIMENTS

Figure 2:
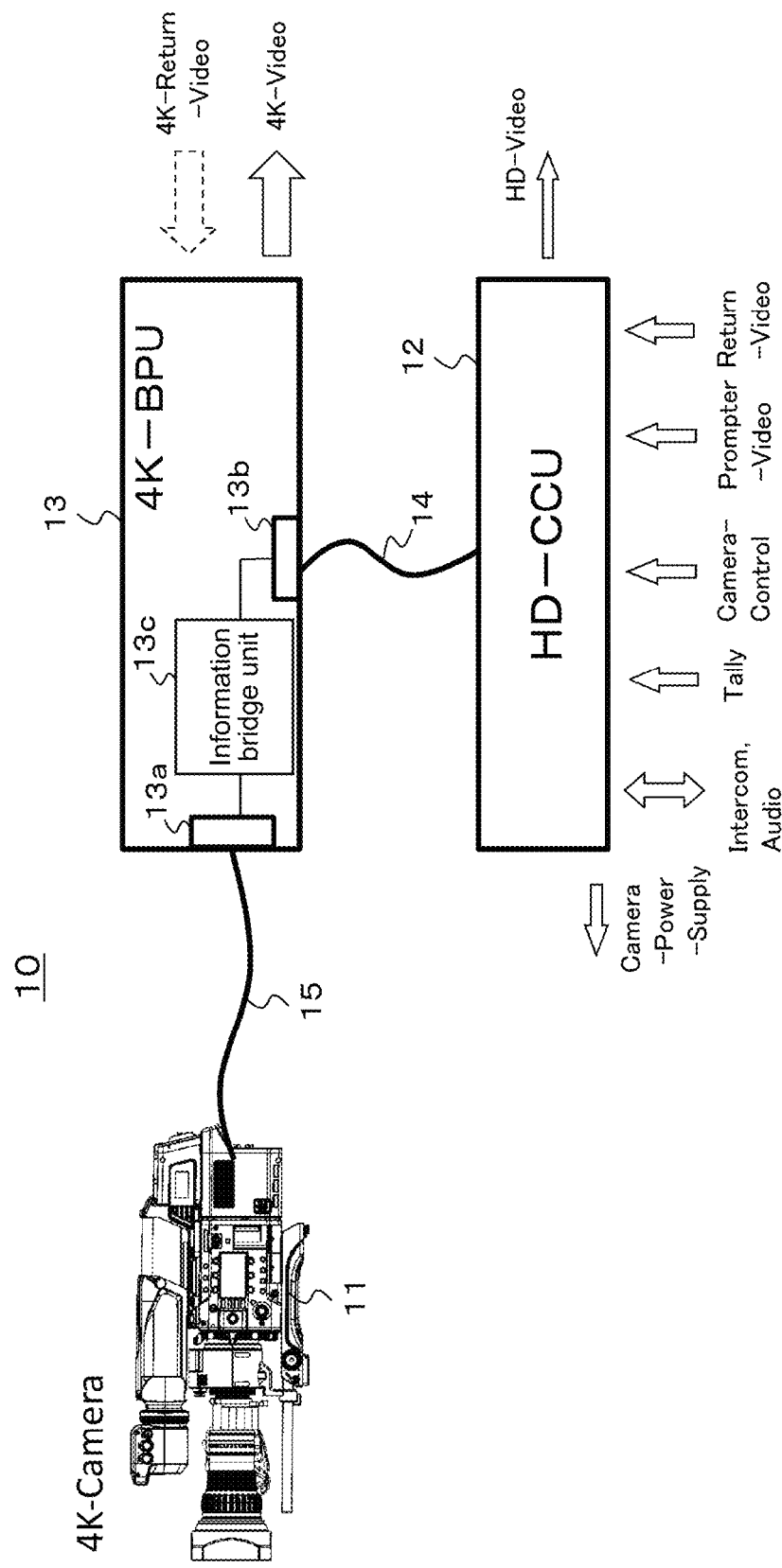
FIG. 2 is a diagram showing a structural example of a camera system (4K-Hybrid-SYSTEM) as an embodiment.

Hereinafter, an embodiment of the present disclosure will be described. Descriptions will be given in the following order.

1. Embodiment
2. Modified example

1. Embodiment

Structural Example of Camera System

FIG. 1A shows a structural example of a camera system (HD-SYSTEM) 60. The camera system 60 includes an HD-resolution camera unit (HD_Camera) 61 and a camera control unit 62 for an HD-resolution camera unit (HD_CCU) that are connected via an optical camera cable 63 as an HD optical transmission path.

The optical camera cable 63 is a complex cable incorporating a pair of fiber cables, a power supply line, and two control lines and supports transmission rates of, for example, 1.5 GHz, 3 GHz, and 3.7 GHz. The camera control unit 62 carries out video signal processing, a format conversion, and a distribution output and supports various interfaces. A dedicated optical transmission interface (I/F) is interposed between the camera unit 61 and the camera control unit 62.

FIG. 1B shows a structural example of a camera system (4K-SYSTEM) 70. The camera system 70 includes a 4K-resolution camera unit (4K_Camera) 71 and a camera control unit 72 for a 4K-resolution camera unit (4K_CCU) that are connected via an optical camera cable 73 as a 4K optical transmission path.

As the optical camera cable 73, the HD optical camera cable described above can be used as it is. It should be noted that optical laser communication corresponding to large-scale data is performed, and a transmission rate of, for example, 10 GHz or more is achieved. The camera control unit 72 carries out video signal processing, a format conversion, and a distribution output and supports various interfaces similar to the HD camera control unit, and also includes a 4K video signal processing function. A dedicated optical transmission interface (I/F) with which 4K signals can be transmitted is interposed between the camera unit 71 and the camera control unit 72.

As described above, for structuring the 4K camera system (4K-SYSTEM) 70, the dedicated optical transmission interface (I/F) function with which 4K signals can be transmitted and the camera control unit 72 including the function of processing 4K video signals become necessary.

FIG. 2 is a diagram showing a structural example of a camera system (4K-Hybrid-SYSTEM) 10 as the embodiment. The camera system 10 includes a 4K-resolution camera unit (4K_Camera) 11, a camera control unit (HD_CCU) 12 for an HD-resolution camera unit, and an intermediate unit (4K-BPU: 4K-Baseband Process Unit) 13.

The intermediate unit 13 includes a connect unit (first connect unit) 13a and a connect unit (second connect unit) 13b. The camera control unit 12 is connected to the connect unit 13b of the intermediate unit 13 via an optical camera cable 14 as the HD optical transmission path. The optical camera cable 14 is a complex cable incorporating a pair of fiber cables, a power supply line, and two control lines and supports transmission rates of, for example, 1.5 GHz, 3 GHz, and 3.7 GHz.

Further the camera unit 11 is connected to the connect unit 13a of the intermediate unit 13 via an optical camera cable 15 as the 4K optical transmission path. As the optical camera cable 15, the HD optical camera cable described above can be used as it is. It should be noted that optical laser communication corresponding to large-scale data is performed, and a transmission rate of, for example, 10 GHz or more is achieved.

In this case, the intermediate unit (4K-BPU) 13 includes both the optical transmission interface with respect to the 4K-resolution camera unit (4K_Camera) and the optical transmission interface with respect to the camera control unit for an HD-resolution camera unit (HD_CCU). As a result, when seen from the camera unit (4K_Camera) 11 side, the connection with the intermediate unit (4K-BPU) 13 becomes the connection with the camera control unit for a 4K-resolution camera unit (4K_CCU). Moreover, when seen from the camera control unit (HD_CCU) 12 side, the connection with the intermediate unit (4K-BPU) 13 becomes the connection with the HD-resolution camera unit (HD_Camera).

Specifically, the intermediate unit (4K-BPU) 13 establishes the connection with the camera control unit (HD_CCU) 12 using a protocol interface of the HD-resolution camera unit (HD_Camera). Further, the intermediate unit (4K-BPU) 13 establishes the connection with the camera unit (4K_Camera) 11 using a protocol interface of the camera control unit for a 4K-resolution camera unit (4K_CCU).

As an interface function for various signals that does not depend on the format of the camera unit, the function of the camera control unit (HD_CCU) 12 for an HD-resolution camera unit is used. In other words, in the camera system 10, a structure corresponding to the camera control unit for a 4K-resolution camera unit (4K_CCU) is realized by a combination of the intermediate unit (4K-BPU) 13 and the camera control unit (HD_CCU) 12.

In the intermediate unit (4K-BPU) 13, an information bridge unit 13c is interposed between the connect unit 13a and the connect unit 13b. The information bridge unit 13c bridges information exchanged between the camera unit (4K_Camera) 11 and the camera control unit (HD_CCU) 12.

In this case, the information bridge unit 13c has a video signal converter that converts a 4K-resolution video signal into an HD-resolution video signal and a function with which an HD optical transmission interface can be structured and can behave as the HD-resolution camera unit (HD_Camera). Therefore, the intermediate unit (4K-BPU) 13 can be connected to the camera control unit (HD_CCU) 12 for an HD-resolution camera unit.

[Structural Example of Intermediate Unit (4K-BPU)]

Figure 3:
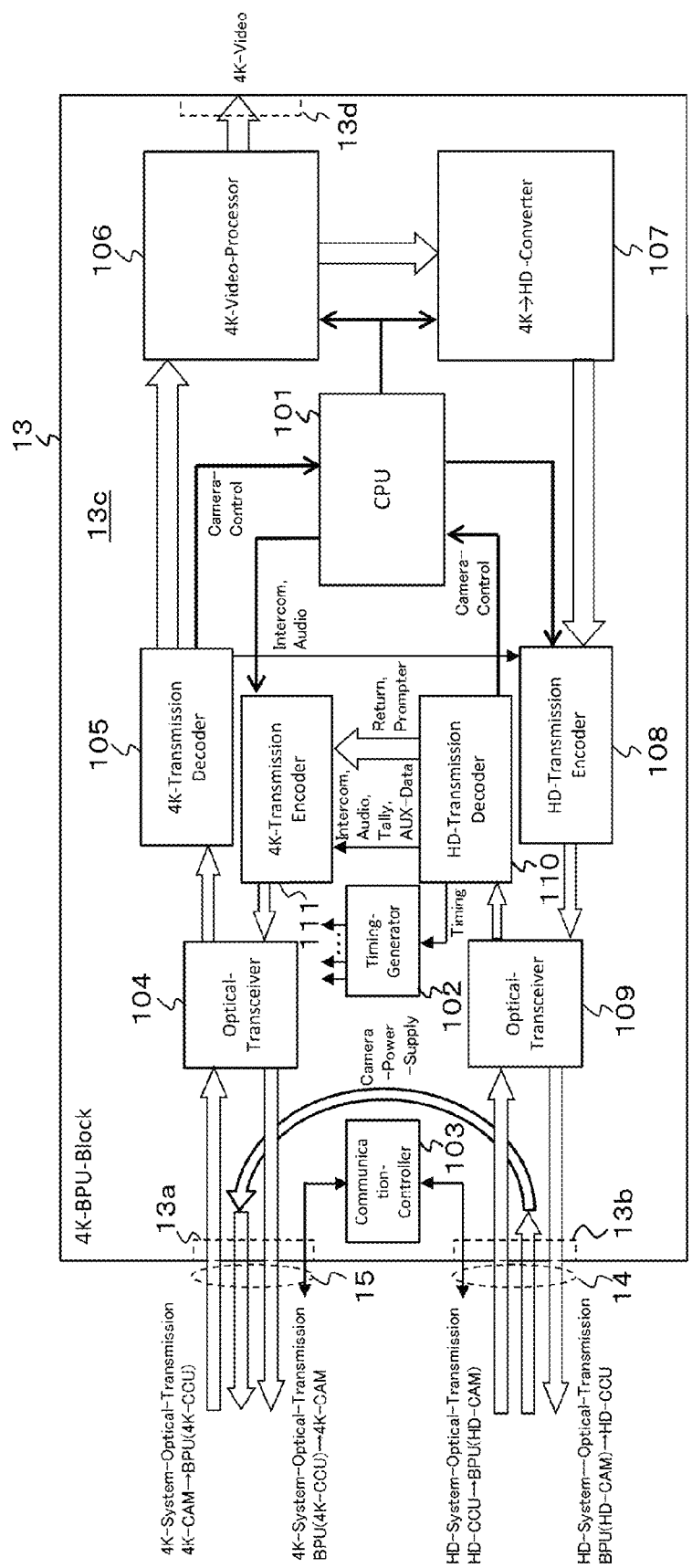
FIG. 3 is a block diagram showing a structural example of an intermediate unit (4K-BPU)

FIG. 3 is a block diagram showing a structural example of the intermediate unit (4K-BPU) 13. The intermediate unit 13 includes a CPU (Central Processing Unit) 101, a timing-generator 102, and a communication-controller 103. The intermediate unit 13 also includes an optical-transceiver 104, a 4K-transmission-decoder 105, and a 4K-video-processor 106.

The intermediate unit 13 also includes a 4K/HD-converter 107, an HD-transmission-encoder 108, and an optical-transceiver 109. The intermediate unit 13 also includes an HD-transmission-decoder 110 and a 4K-transmission-encoder 111. The respective parts of the intermediate unit 13 described above constitute the information bridge unit 13c.

The CPU 101 controls the respective parts of the intermediate unit 13. The timing-generator 102 generates various timing signals based on timing signals extracted from signals transmitted from the camera control unit 12 by an optical transmission, transmits the signals to the respective parts of the intermediate unit 13, and controls the processing timings of the parts. In other words, the intermediate unit 13 is operated based on the timings by the timing signals extracted from the signals transmitted from the camera control unit 12 by an optical transmission.

The timing-generator 102 regenerates the timing signals to be optically transmitted to the camera unit 11 based on the timing signals extracted from the signals transmitted from the camera control unit 12 by an optical transmission. In this case, in consideration of a delay requisite for the 4K-resolution video signal processing in the 4K-video-processor 106, the timing signals are regenerated such that a phase of the camera unit 11 becomes optimal.

The communication-controller 103 uses the control lines to control the optical communication of the camera unit 11 and the camera control unit 12 and the power supply from the camera control unit 12 to the camera unit 11.

Even when the optical camera cable 15 on the camera unit 11 side is not connected, the intermediate unit 13 outputs a 4K-resolution video signal such as a color bar (CB) signal. Therefore, since a reference lock with respect to the camera control unit 12 side is necessary, there is a need to perform optical communication with the camera control unit 12 without supplying power.

The communication-controller 103 mediates a power supply request from the camera unit 11 to the camera control unit 12 when the optical camera cable 15 on the camera unit 11 is connected. Specifically, in response to the power supply request from the camera unit 11 transmitted via the control line, the communication-controller 103 transmits the power supply request to the camera control unit 12 via the control line of the optical camera cable 14 on the camera control unit 12 side.

In the structure of the intermediate unit 13 shown in FIG. 3, the intermediate unit 13 has a structure in which a power supply from the camera control unit 12 is supplied straight to the camera unit 11. However, a structure in which a power supply source for a 4K-resolution camera unit (4K_Camera) is incorporated into the intermediate unit 13 so that power is supplied to the camera unit 11 from the power supply source may also be used.

The optical-transceiver 104 performs optical communication with the camera unit 11 connected via the optical camera cable 15. By the optical communication, signals in a 4K transmission format including a video signal and a camera control signal are exchanged with the camera unit 11.

The 4K-transmission-decoder 105 carries out decode processing on the 4K transmission format signal received by the optical-transceiver 104 and acquires a signal (4K-video, Control, Intercom, etc.) transmitted from the camera unit 11. The 4K-transmission-encoder 111 carries out encode processing on the signal (Return, Intercom, Control, etc.) received from the camera control unit 12 and generates a 4K transmission format signal to be transmitted.

The optical-transceiver 109 performs optical communication with the camera control unit 12 connected via the optical camera cable 14. By the optical communication, HD transmission format signals including a video signal and a camera control signal are exchanged with the camera control unit 12.

The HD-transmission-decoder 110 carries out decode processing on the HD transmission format signal received by the optical-transceiver 109 and acquires a signal (Return, Intercom, Control, etc.) transmitted from the camera control unit 12. The HD-transmission-encoder 108 carries out encode processing on the signal (Intercom, Control, etc.) received from the camera unit 11, the HD-resolution video signal generated by the 4K/HD-converter 107, and the like and generates HD transmission format signals to be transmitted.

The 4K-video-processor 106 carries out necessary processing on the 4K-resolution video signal (4K-Video) received from the camera unit 11, such as gain-up processing and gamma correction processing. Although not described above, the intermediate unit 13 includes a video signal output unit 13d that outputs the processed 4K-resolution video signal to outside of the apparatus. It should be noted that when the optical camera cable 15 on the camera unit 11 side is not connected, the 4K-video-processor 106 outputs the 4K-resolution video signal such as a color bar signal. The 4K/HD-converter 107 converts the 4K-resolution video signal into an HD-resolution video signal.

The CPU 101 mediates communication related to camera control between the camera unit 11 and the camera control unit 12. In this case, the CPU 101 temporarily accepts a camera control signal (command) from the camera control unit 12. Then, the CPU 101 replaces the signal by a control signal for the camera unit 11 as necessary and transmits it to the camera unit 11. As a specific example, a command arrangement of splitting a command that needs to be performed in the intermediate unit 13, for example, the 4K-video-processor 106, and a command that needs to be performed on the camera unit 11 side is carried out.

An operation of the intermediate unit 13 shown in FIG. 3 will be described. When connected to the camera control unit 12 via the optical camera cable 14, the HD-transmission-decoder 110 takes out a timing signal embedded in the optical transmission signal from the camera control unit 12 and supplies it to the timing-generator 102.

In the timing-generator 102, various timing signals are generated based on the timing signal and transmitted to the respective parts of the intermediate unit 13 so that the processing timings of the respective parts are controlled. Accordingly, the intermediate unit 13 is put to a state where it is operated based on the timings of the timing signals transmitted from the camera control unit 12 by an optical transmission. In this case, for example, an output phase of the 4K-resolution video signal such as a color bar (CB) signal output from the 4K-video-processor 106 is also locked with respect to the timing signal transmitted from the camera control unit 12 by an optical transmission.

Next, when connected with the camera control unit 12 via the optical camera cable 15, a power supply request is transmitted to the communication-controller 103 from the camera unit 11 via the control line in the optical camera cable 15. As a result, power is supplied from the camera control unit 12 to the camera unit 11 via the power supply line of the optical camera cables 14 and 15.

Next, an information transmission operation from the camera control unit 12 to the camera unit 11 side will be described. In the optical-transceiver 109, an HD transmission format signal optically transmitted from the camera control unit 12 via the optical camera cable 14 is received. The HD transmission format signal is supplied to the HD-transmission-decoder 110, and a signal (Return, Intercom, Control, etc.) transmitted from the camera control unit 12 is acquired. Here, the Return signal is an HD-resolution video signal.

Of the signals acquired by the HD-transmission-decoder 110, the camera control signal (Camera-Control) is supplied to the CPU 101, and other signals are supplied to the 4K-transmission-encoder 111. The CPU 101 splits the command that needs to be performed in the intermediate unit 13 and the command that needs to be performed on the camera unit 11 side.

Then, the command that needs to be performed on the camera unit 11 side (camera control signal) is supplied to the 4K-transmission-encoder 111. Further, the CPU 101 controls relevant processing such as gain-up processing and gamma correction processing in the 4K-video-processor 106 based on the command that needs to be performed in the intermediate unit 13.

The 4K-transmission-encoder 111 carries out encode processing on the signals (Return, Intercom, Control, etc.) supplied from the HD-transmission-decoder 110 and the CPU 101 and generates 4K transmission format signals to be transmitted. In this case, a timing signal regenerated by the timing-generator 102 is embedded in the 4K transmission format signal. In the timing-generator 102, in consideration of a processing delay in the 4K-video-processor 106, the timing signals are regenerated such that the phase of the camera unit 11 becomes optimal.

The 4K transmission format signal generated by the 4K-transmission-encoder 111 is supplied to the optical-transceiver 104. In the optical-transceiver 104, the 4K transmission format signal is optically transmitted to the camera unit 11 via the optical camera cable 15.

Next, an information transmission operation from the camera unit 11 to the camera control unit 12 side will be described. The optical-transceiver 104 receives the 4K transmission format signal optically transmitted from the camera unit 11 via the optical camera cable 15. The 4K transmission format signal is supplied to the 4K-transmission-decoder 105, and a signal (4K-Video, Intercom, Control, etc.) transmitted from the camera unit 11 is acquired.

Of the signals acquired by the 4K-transmission-decoder 105, the 4K-resolution video signal (4K-Video) is supplied to the 4K-video-processor 106, the camera control (Camera-Control) signal (command response) is supplied to the CPU 101, and other signals are supplied to the HD-transmission-encoder 108. The CPU 101 adds other command responses to the command response from the camera unit 11 as necessary and supplies them to the HD-transmission-encoder 108.

The 4K-video-processor 106 carries out necessary processing such as gain-up processing and gamma correction processing on the 4K-resolution video signal (4K-Video). Then, the processed 4K-resolution video signal is output to the video signal output unit 13d and also to the 4K/HD-converter 107. In the 4K/HD-converter 107, the 4K-resolution video signal is converted into an HD-resolution video signal (HD-Video). The HD-resolution video signal is supplied to the HD-transmission-encoder 108.

The HD-transmission-encoder 108 carries out encode processing on the signals (HD-Video, Intercom, Control, etc.) supplied from the 4K-transmission-decoder 105, the CPU 101, and the 4K/HD-converter 107 and generates HD transmission format signals to be transmitted. The HD transmission format signals are supplied to the optical-transceiver 109. The optical-transceiver 109 optically transmits the HD transmission format signals to the camera control unit 12 via the optical camera cable 14.

In the camera system 10 described above, the intermediate unit (4K-BPU) 13 is interposed between the 4K-resolution camera unit (4K_Camera) 11 and the camera control unit (HD_CCU) 12 for an HD-resolution camera unit. With this structure, the camera unit 11 can be connected to the camera control unit 12 for an HD-resolution camera unit to be used.

Therefore, for example, costs in introducing the 4K-resolution camera unit 11 can be reduced. In other words, in introducing the 4K-resolution camera unit 11, a studio apparatus or mobile unit apparatus connected to the camera control unit 12 for an HD-resolution camera unit can be used as it is.

Figure 4:
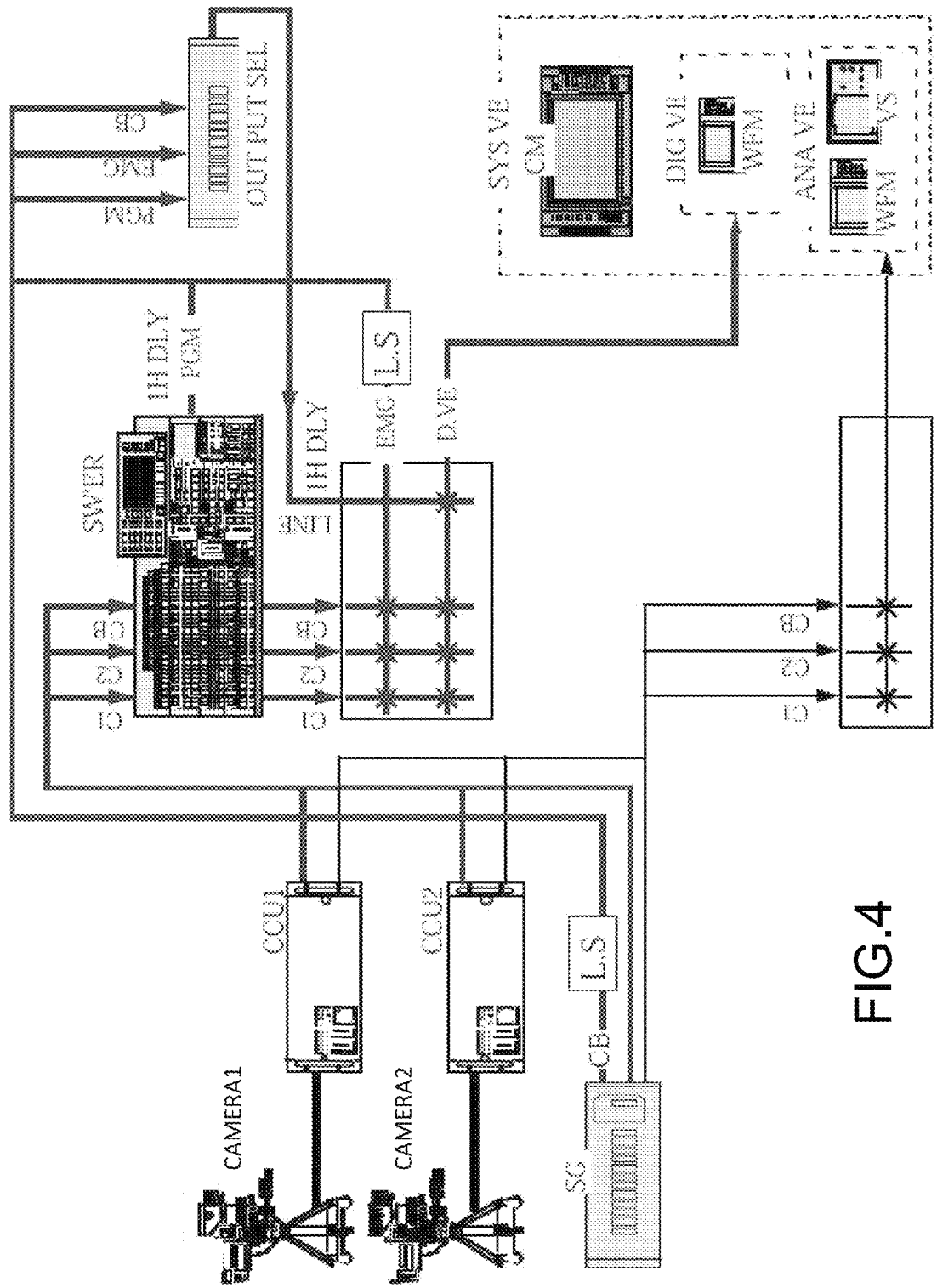
FIG. 4 is a diagram showing a connection example of a camera unit (Camera), a camera control unit (CCU), and a studio apparatus or mobile unit apparatus.

FIG. 4 is a diagram showing a connection example of the camera unit (Camera), the camera control unit (CCU), and the studio apparatus or mobile unit apparatus. The connection example shows an example of a case where two camera units are used. The camera units are operated while being connected to the studio apparatus or mobile unit apparatus via corresponding camera control units.

Various interfaces necessary for operating the camera unit are collectively connected to the camera control unit. For simplifying handling of the camera unit, the camera control unit is incorporated in the system. Therefore, in introducing the 4K-resolution camera unit 11, it is not easy to change the camera control unit into that for a 4K-resolution camera unit, and restructuring of the entire system including the studio apparatus or mobile unit apparatus becomes necessary.

Figure 5:
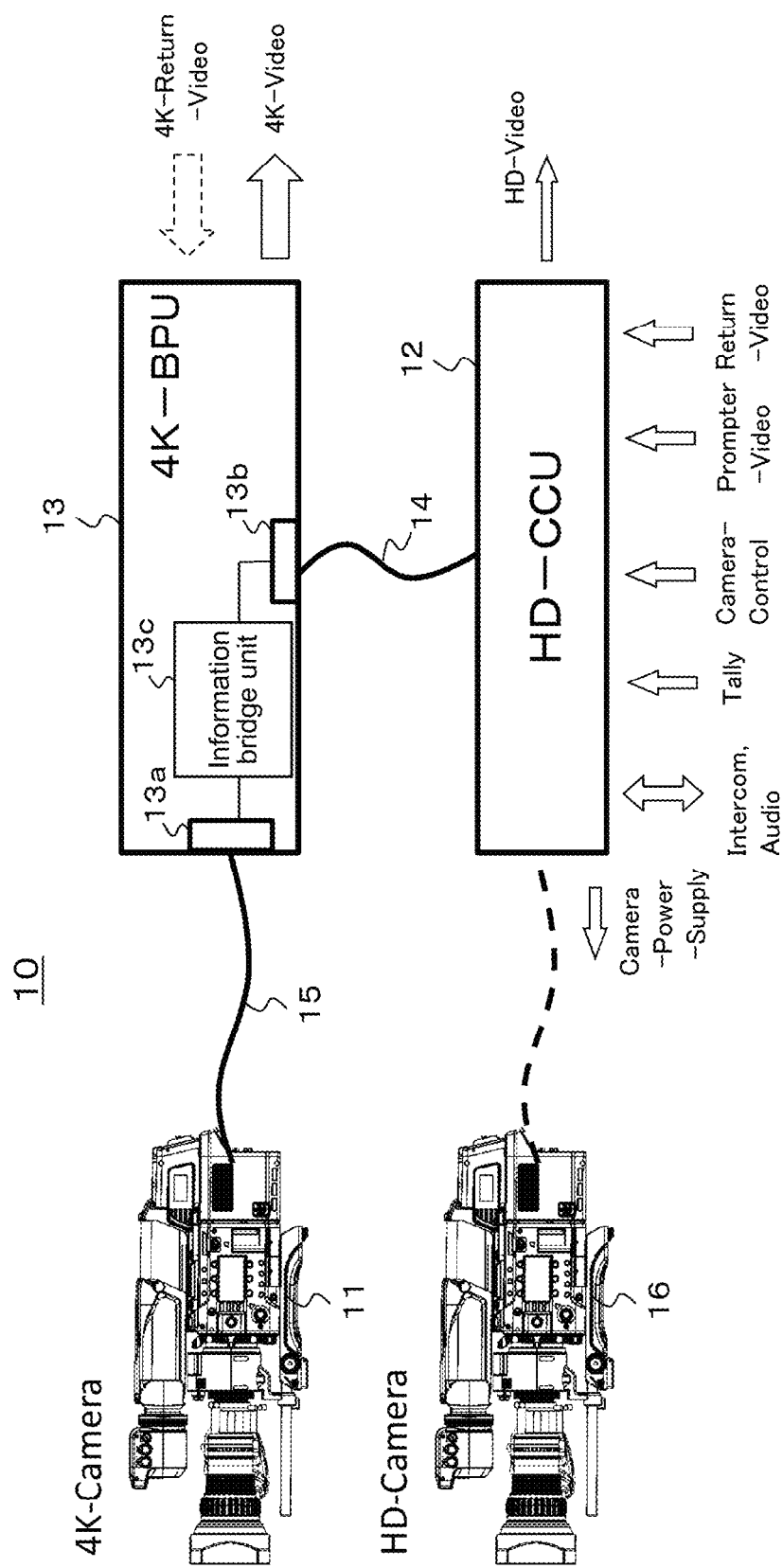
FIG. 5 is a diagram for explaining a changeability of the camera system.

It should be noted that although only the main flows of a main video signal and monitor video signal are shown in the connection example of FIG. 4, system wirings exist for each of the following signal types in the actual wirings.
Reference signal system
Return video system, prompter video system
Intercom system
MIC audio, program/audio system
Camera control system
TALLY system
Others, AUX-Data system Further, in the camera system 10 described above, the camera control unit 12 is for an HD-resolution camera unit. Therefore, for example, as indicated by the broken line of FIG. 5, by merely changing the connection of the optical camera cable to an HD-resolution camera unit (HD_Camera) 16, the operation of the camera system (see FIG. 1A) as the HD-SYSTEM becomes possible.

Moreover, in the camera system 10 described above, the intermediate unit 13 includes the 4K-video-processor 106 that processes the 4K-resolution video signal transmitted from the camera unit 11. Therefore, for example, a processing load of the video signals in the camera unit 11 can be reduced, and the structure of the processing system can be simplified.

Further, in the camera system 10 described above, the video signal output unit 13d that outputs the 4K-resolution video signal generated by the 4K-video-processor 106 is provided. Therefore, similar to the camera system 70 that uses the camera control unit for a 4K-resolution camera unit (4K_CCU) (see FIG. 1B), the 4K-resolution video signal (4K-Video) and the HD-resolution video signal (HD-Video) can be obtained.

Furthermore, in the camera system 10 described above, the CPU 101 in the intermediate unit 13 mediates a camera control signal communicated between the camera unit 11 and the camera control unit 12. Therefore, for example, of the commands transmitted from the camera control unit, only necessary commands can be selected and sent to the camera control unit 11. Further, the CPU 101 can accurately perform processing control of a camera function unit that exists in the intermediate unit 13, which is, for example, the 4K-video-processor 106.

Moreover, in the camera system 10 described above, the communication-controller 103 in the intermediate unit 13 mediates a power supply request from the camera unit 11 to the camera control unit 12. Therefore, for example, in a state where the optical camera cable 15 on the camera unit 11 side is not connected, a power supply at a high voltage is not performed from the camera control unit 12 side through the power supply line, and thus an unexpected contingency such as an electrification can be prevented from occurring.

2. Modified Example

Figure 6:
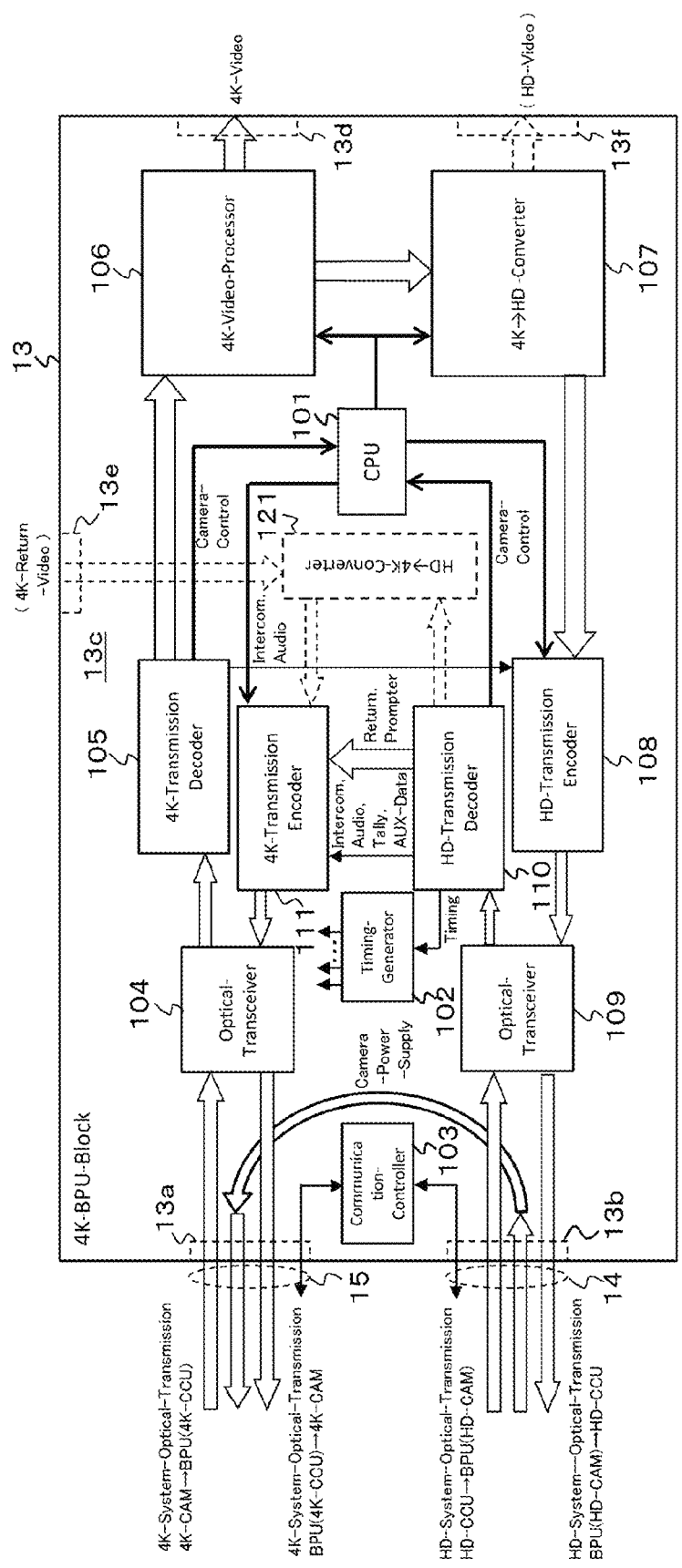
FIG. 6 is a block diagram showing another structural example of the intermediate unit (4K-BPU)

It should be noted that the embodiment above has shown the example where the Return signal that the intermediate unit 13 transmits to the camera unit 11 is an HD-resolution video signal. However, when there is a need to return the signal to the camera unit 11 in the form of a 4K-resolution video signal, it is possible to incorporate an HD/4K-converter 121 as indicated by the broken line of FIG. 6 and provide a video signal input unit 13e for inputting a 4K-resolution Return video signal as necessary. With this structure, it becomes possible to transmit the 4K-resolution Return video signal to the camera unit 11. Moreover, as indicated by the broken line of FIG. 6, a video signal output unit 13f for outputting an HD-resolution video signal (HD-Video) may be provided in the intermediate unit 13 as necessary.

Moreover, the embodiment above has shown the camera system 10 in which the 4K-resolution camera unit (4K_Camera) 11 is connected to the HD-resolution camera control unit (HD_CCU) 12 via the intermediate unit 13. However, the present disclosure is also applicable to an HFR (High-Frame-Rate) camera system.

Figure 7:
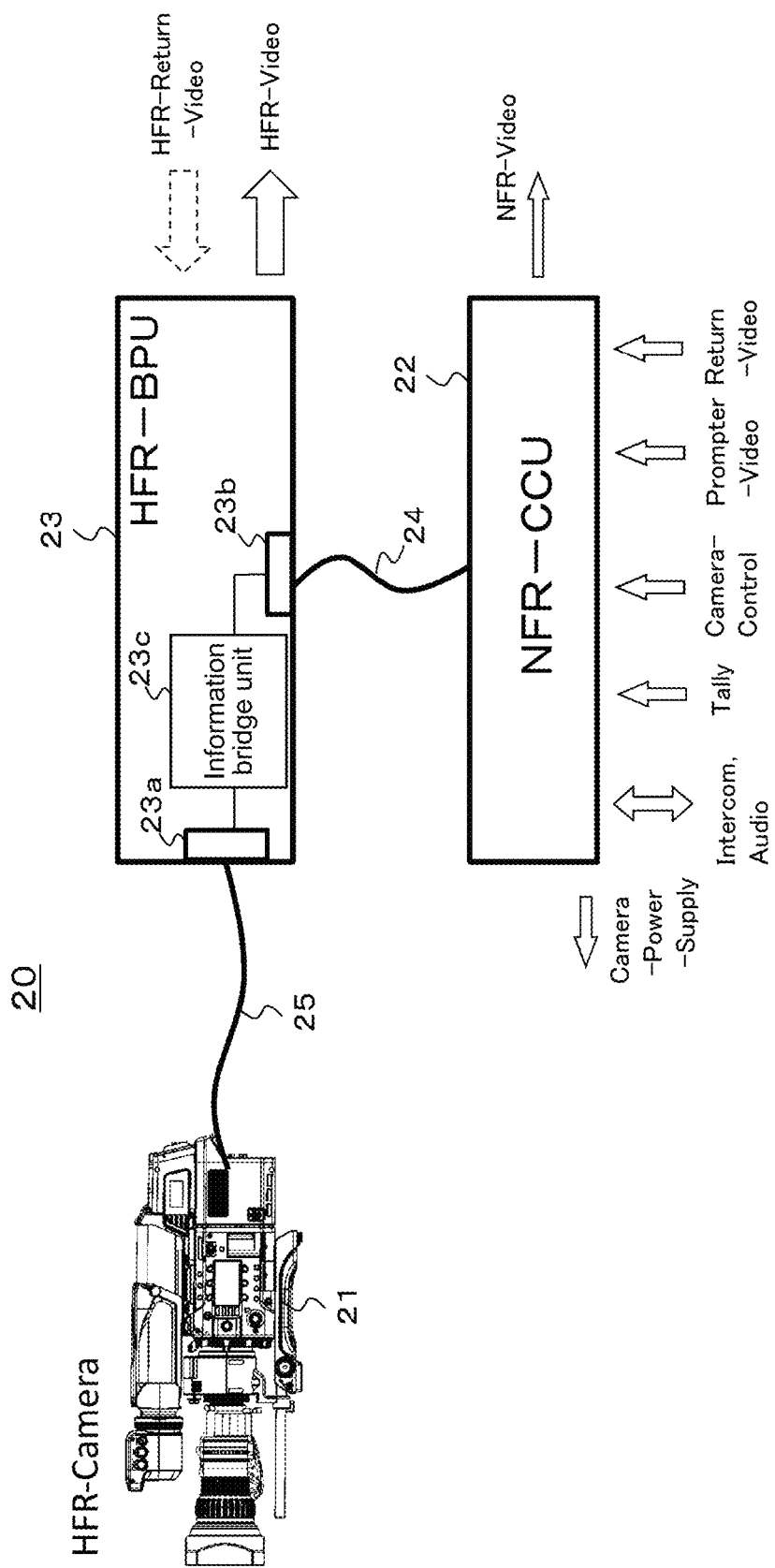
FIG. 7 is a diagram showing a structural example of a camera system (HFR-Hybrid-SYSTEM).

FIG. 7 is a diagram showing a structural example of a camera system (HFR-Hybrid-SYSTEM) 20. The camera system 20 includes an HFR camera unit (HFR_Camera) 21, a camera control unit (NFR_CCU) 22 for an NFR (Normal Frame Rate) camera unit of, for example, 60 Hz or 50 Hz, and an intermediate unit (HFR-BPU: HFR-Baseband Process Unit) 23.

The intermediate unit 23 includes a connect unit (first connect unit) 23a and a connect unit (second connect unit) 23b. The camera control unit 22 is connected to the connect unit 23b of the intermediate unit 23 via an optical camera cable 24 as an NFR optical transmission path. Further, the camera unit 21 is connected to the connect unit 23a of the intermediate unit 23 via an optical camera cable 25 as an HFR optical transmission path.

In this case, the intermediate unit (HFR-BPU) 23 includes both an optical transmission interface with respect to an HFR camera unit (HFR_Camera) and an optical transmission interface with respect to the camera control unit for an NFR camera unit (NFR_CCU). Accordingly, when seen from the camera unit (HFR_Camera) 21 side, the connection with the intermediate unit (HFR-BPU) 23 becomes a connection with the camera control unit for an HFR camera unit (HFR_CCU). Moreover, when seen from the camera control unit (NFR_CCU) 22 side, the connection with the intermediate unit (HFR-BPU) 23 becomes a connection with the NFR camera unit (NFR_Camera).

In other words, the intermediate unit (HFR-BPU) 23 establishes the connection with the camera control unit (NFR_CCU) 22 using a protocol interface of the NFR camera unit (NFR_Camera). The intermediate unit (HFR-BPU) 23 also establishes the connection with the camera unit (HFR_Camera) 21 using a protocol interface of the camera control unit for an HFR camera unit (HFR_CCU).

As an interface function for various signals that does not depend on the format of the camera unit, the function of the camera control unit (NFR_CCU) 22 for an NFR camera unit is used. In other words, in the camera system 20, a structure corresponding to the camera control unit for an HFR camera unit (HFR_CCU) is realized by a combination of the intermediate unit (HFR-BPU) 23 and the camera control unit (NFR_CCU) 22.

In the intermediate unit (HFR-BPU) 23, an information bridge unit 23c is interposed between the connect unit 23a and the connect unit 23b. The information bridge unit 23c bridges information exchanged between the camera unit (HFR_Camera) 21 and the camera control unit (NFR_CCU) 22.

In this case, the information bridge unit 23c has a video signal converter that converts an HFR video signal into an NFR video signal and a function with which an NFR optical transmission interface can be structured and can behave as the NFR camera unit (NFR_Camera). Therefore, the intermediate unit (HFR-BPU) 23 can be connected to the camera control unit (NFR_CCU) 22 for an NFR camera unit.

The camera system 20 shown in FIG. 7 bears the same effect as the camera system 10 described above shown in FIG. 2. It should be noted that the present disclosure is not limited to the structure of the camera system 10 shown in FIG. 2 and the structure of the camera system 20 shown in FIG. 7 and can be generally applied to a case of connecting a camera unit having a first resolution in a spatial or temporal direction to a camera control unit for a camera unit having a second resolution lower than the first resolution in the spatial or temporal direction.

Further, the present disclosure may also take the following structures.

(1) An intermediate unit, including:

a first connect unit for connecting a camera unit having a first resolution in one of a spatial direction and a temporal direction;

a second connect unit for connecting a camera control unit for a camera unit having a second resolution lower than the first resolution in one of the spatial direction and the temporal direction; and an information bridge unit that is interposed between the first connect unit and the second connect unit and configured to bridge information exchanged between the camera unit and the camera control unit.

(2) The intermediate unit according to (1) above, in which the information bridge unit converts a video signal of the first resolution input to the first connect unit from the camera unit into a video signal of the second resolution and outputs the signal to the second connect unit.

(3) The intermediate unit according to (2) above, in which the information bridge unit carries out camera signal processing on the video signal of the first resolution before the video signal of the first resolution input to the first connect unit from the camera unit is converted into the video signal of the second resolution.

(4) The intermediate unit according to (3) above, further including a video signal output unit configured to externally output the video signal of the first resolution that has been subjected to the camera signal processing by the information bridge unit.

(5) The intermediate unit according to any one of (1) to (4), in which the information bridge unit outputs a color bar signal corresponding to the video signal of the first resolution in a state where the video signal of the first resolution is not supplied to the first connect unit from the camera unit.

(6) The intermediate unit according to any one of (1) to (5),
in which the information bridge unit mediates a communication related to cameral control between the camera unit and the camera control unit.
(7) The intermediate unit according to any one of (1) to (6),
in which the information bridge unit mediates a power supply request from the camera unit to the camera control unit.
(8) The intermediate unit according to any one of (1) to (7),
in which the information bridge unit extracts a timing signal from a camera control signal input to the second connect unit from the camera control unit and controls processing timings of the units based on the timing signal.
(9) The intermediate unit according to any one of (1) to (8),
in which the first resolution is a 4K resolution, and the second resolution is an HD resolution.
(10) The intermediate unit according to any one of (1) to (8),
in which the first resolution is a high frame rate resolution, and the second resolution is a normal frame rate resolution.
(11) A camera system, including:
a camera unit having a first resolution in one of a spatial direction and a temporal direction;
a camera control unit for a camera unit having a second resolution lower than the first resolution in one of the spatial direction and the temporal direction; and
an intermediate unit interposed between the camera unit and the camera control unit,
the intermediate unit including
a first connect unit for connecting the camera unit via a first transmission path,
a second connect unit for connecting the camera control unit via a second transmission path, and
an information bridge unit that is interposed between the first connect unit and the second connect unit and bridges information exchanged between the camera unit and the camera control unit.

It should be understood by those skilled in the art that various modifications, combinations, sub-combinations and alterations may occur depending on design requirements and other factors insofar as they are within the scope of the appended claims or the equivalents thereof.

What is claimed is:
1. An intermediate unit, comprising:
a first connect circuitry connected to a first camera unit having a first resolution in one of a spatial direction and a temporal direction;
a second connect circuitry connected to a camera control unit for a second camera unit, the second camera unit having a second resolution that is lower than the first resolution in one of the spatial direction and the temporal direction; and
an information bridge circuitry positioned between the first connect circuitry and the second connect circuitry and configured to interact between the first camera unit and the camera control unit for the second camera unit, wherein
a first signal is transmitted from the first connect circuitry to transmit a video signal having the second resolution to the second camera, and
a second signal is transmitted from the second connect circuitry to transmit a video signal having the first resolution to the first camera.
2. The intermediate unit according to claim 1,
wherein the information bridge circuitry converts a video signal of the first resolution input to the first connect circuitry from the camera unit into a video signal of the second resolution and outputs the signal to the second connect circuitry.
3. The intermediate unit according to claim 2,
wherein the information bridge circuitry carries out camera signal processing on the video signal of the first resolution before the video signal of the first resolution input to the first connect circuitry from the camera unit is converted into the video signal of the second resolution.
4. The intermediate unit according to claim 3, further comprising
a video signal output circuitry configured to externally output the video signal of the first resolution that has been subjected to the camera signal processing by the information bridge circuitry.
5. The intermediate unit according to claim 1,
wherein the information bridge circuitry outputs a color bar signal corresponding to the video signal of the first resolution in a state where the video signal of the first resolution is not supplied to the first connect circuitry from the camera unit.
6. The intermediate unit according to claim 1,
wherein the information bridge circuitry mediates a communication related to cameral control between the camera unit and the camera control unit.
7. The intermediate unit according to claim 1,
wherein the information bridge circuitry mediates a power supply request from the camera unit to the camera control unit.
8. The intermediate unit according to claim 1,
wherein the information bridge circuitry extracts a timing signal from a camera control signal input to the second connect circuitry from the camera control unit and controls processing timings of the units based on the timing signal.
9. The intermediate unit according to claim 1,
wherein the first resolution is a 4K resolution, and the second resolution is an HD resolution.
10. The intermediate unit according to claim 1,
wherein the first resolution is a high frame rate resolution, and the second resolution is a normal frame rate resolution.
11. A camera system, comprising:
a camera unit having a first resolution in one of a spatial direction and a temporal direction;
a camera control unit for a camera unit having a second resolution lower than the first resolution in one of the spatial direction and the temporal direction; and
an intermediate unit interposed between the camera unit and the camera control unit,
the intermediate unit including:
a first connect circuitry connected to a first camera unit having a first resolution in one of a spatial direction and a temporal direction;
a second connect circuitry connected to a camera control unit for a second camera unit, the second camera unit having a second resolution that is lower than the first resolution in one of the spatial direction and the temporal direction; and
an information bridge circuitry positioned between the first connect circuitry and the second connect circuitry and configured to interact between the first camera unit and the camera control unit for the second camera unit, wherein
a first signal is transmitted from the first connect circuitry to transmit a video signal having the second resolution to the second camera, and a second signal is transmitted from the second connect circuitry to transmit a video signal having the first resolution to the first camera.

12. The camera system according to claim 11,
wherein the information bridge circuitry converts a video signal of the first resolution input to the first connect circuitry from the camera unit into a video signal of the second resolution and outputs the signal to the second connect circuitry.

13. The camera system according to claim 12,
wherein the information bridge circuitry carries out camera signal processing on the video signal of the first resolution before the video signal of the first resolution input to the first connect circuitry from the camera unit is converted into the video signal of the second resolution.

14. The camera system according to claim 13, further comprising
a video signal output circuitry configured to externally output the video signal of the first resolution that has been subjected to the camera signal processing by the information bridge circuitry.

15. The camera system according to claim 11,
wherein the information bridge circuitry outputs a color bar signal corresponding to the video signal of the first resolution in a state where the video signal of the first resolution is not supplied to the first connect circuitry from the camera unit.

16. The camera system according to claim 11,
wherein the information bridge circuitry mediates a communication related to cameral control between the camera unit and the camera control unit.

17. The camera system according to claim 11,
wherein the information bridge circuitry mediates a power supply request from the camera unit to the camera control unit.

18. The camera system according to claim 11,
wherein the information bridge circuitry extracts a timing signal from a camera control signal input to the second connect circuitry from the camera control unit and controls processing timings of the circuitry based on the timing signal.

19. The camera system according to claim 11,
wherein the first resolution is a 4K resolution, and the second resolution is an HD resolution.

20. The camera system according to claim 11,
wherein the first resolution is a high frame rate resolution, and the second resolution is a normal frame rate resolution.

* * * * *